(12) United States Patent
Cha

(10) Patent No.: US 11,608,042 B2
(45) Date of Patent: Mar. 21, 2023

(54) MASTER CYLINDER FOR BRAKE

(71) Applicant: HYUNDAI MOBIS CO., LTD., Seoul (KR)

(72) Inventor: Myeon Gyu Cha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/318,570

(22) Filed: May 12, 2021

(65) Prior Publication Data
US 2021/0354673 A1    Nov. 18, 2021

(30) Foreign Application Priority Data

May 12, 2020    (KR) .......................... 10-2020-0056438

(51) Int. Cl.
*B60T 11/16* (2006.01)
*B60T 11/18* (2006.01)

(52) U.S. Cl.
CPC ............. *B60T 11/165* (2013.01); *B60T 11/18* (2013.01)

(58) Field of Classification Search
CPC .. B60T 7/04; B60T 11/20; B60T 11/18; B60T 11/165
See application file for complete search history.

(56) References Cited

U.S. PATENT DOCUMENTS 9,643,584 B2 *    5/2017    Strengert .............. B60T 8/3265

FOREIGN PATENT DOCUMENTS

KR    20110125109 A  *  10/2011    .............. B60T 11/16
KR    1020120003299 A    1/2012

OTHER PUBLICATIONS

Machine Translation of KR 2011-0125109 (Year: 2022).*

* cited by examiner

*Primary Examiner* — Abiy Teka
*Assistant Examiner* — Daniel S Collins
(74) *Attorney, Agent, or Firm* — NovoTechIP International PLLC

(57) ABSTRACT

A master cylinder for a brake may include: a cylinder housing a first piston installed in the cylinder housing, and movable by an operation force received from a brake pedal; and a second piston within the cylinder housing, and movable in connection with the first piston, wherein the first piston comprises: a first piston body partially within the cylinder housing; and a booster connection within the direction opposite to that in which the first piston body faces the second piston, integrated with the first piston body, and connected to a booster so as to receive the operation force of the brake pedal.

7 Claims, 8 Drawing Sheets

MASTER CYLINDER FOR BRAKE

CROSS-REFERENCE TO RELATED APPLICATION

This application claims the benefit under 35 U.S.C. § 119(a) of Korean Patent Application No. 10-2020-0056438 filed on May 12, 2020 in the Korean Intellectual Property Office, the entire disclosure of which is incorporated herein by reference for all purposes.

BACKGROUND

Field

Exemplary embodiments of the present disclosure relate to a master cylinder for a brake, and more particularly, to a master cylinder for a brake, which can reduce the number of parts, thereby reducing the weight and manufacturing cost of a product.

Discussion of the Background

In general, the brake of a vehicle refers to an apparatus for decelerating the vehicle or stably maintaining the state in which the vehicle is stopped. During driving, a driver operates the brake to adjust the speed of the vehicle or to maintain the state in which the vehicle is temporarily stopped. When the vehicle is parked or stopped for a long time, the brake serves to secure the state in which the vehicle is stably parked and stopped.

The brake of a vehicle includes a brake pedal, a booster, a master cylinder and a wheel cylinder or caliper cylinder. The brake pedal serves to receive a brake operation of a driver. The booster serves to amplify an operation force of the brake pedal using negative pressure provided from an intake system of an engine. The master cylinder serves to generate high brake pressure through the operation of the booster. The wheel cylinder or the caliper cylinder serves to brake the vehicle using the hydraulic pressure provided from the master cylinder.

The force transferred to the brake pedal when the vehicle is braked is amplified through the booster. When the driver steps on the brake pedal, a boosting force is generated in the booster, while a valve structure inside the booster is opened. According to the conventional structure, a push rod of the booster generates fluid pressure by pushing a piston of the master cylinder.

When the driver suddenly steps on the brake pedal in an emergency situation, the push rod may bump against the piston. In this case, the piston and the push rod may be damaged. In order to solve such a problem, the piston and the push rod may be manufactured of a metallic material such as aluminum. In this case, however, the weight of the brake may be increased, and the manufacturing process may raise the cost of the brake.

Furthermore, a fixing part is formed on a valve body of the booster, in order to fix the push rod. In this case, the weight of the valve body may be increased, and the valve body may unnecessarily occupy a space in the booster. Furthermore, a retainer is added as a separate part to fix the push rod to the valve body. The addition of the retainer may increase the weight of the brake, and raises the manufacturing cost of the brake.

FIGS. 1 to 3 illustrate the structures of a booster and a master cylinder 10 according to the related art. FIG. 1 is a cross-sectional view illustrating a portion of the booster and the master cylinder 10 according to the related art, FIG. 2 is a perspective view illustrating a primary piston 12 and a push rod assembly 30 according to the related art, and FIG. 3 is a perspective view illustrating a valve body 20 according to the related art.

Referring to FIGS. 1 to 3, the master cylinder 10 according to the related art includes a cylinder body 11 and the primary piston 12 and a secondary piston 13. The cylinder body 11 has a space formed therein, and the primary and secondary pistons 12 and 13 are moved along the internal space of the cylinder body 11. The primary piston 12 may be moved in connection with a brake pedal, and the secondary piston 13 may be moved in connection with the primary piston 12.

A force transferred to the brake pedal when a vehicle is braked may be amplified through a booster. When a driver steps on the brake pedal, a valve structure inside the booster may be opened to generate a boosting force. The boosting force may be transferred to the primary piston 12 by the push rod assembly 30.

The push rod assembly 30 according to the related art may include a rod body 31 and a pressing rod 32 assembled to the rod body 31. The rod body 31 may be fixed to the valve body 20 inside the booster, and the pressing rod 32 may be coupled to the rod body 31 and protrude toward the master cylinder 10 so as to push the primary piston 12. At this time, hydraulic pressure for braking may be generated in the master cylinder 10.

When the structures of the push rod assembly 30 and the master cylinder 10 according to the related art are used, the push rod assembly 30 may strongly bump against the primary piston 12 in case where a driver suddenly steps on the brake pedal in an emergency situation. In this case, the primary piston 12 or the push rod assembly 30 may be damaged.

In order to solve such a problem, the primary piston 12 and the push rod assembly 30 according to the related art may be manufactured of a metallic material such as aluminum. In this case, the weight of the master cylinder is increased, and the manufacturing process may raise the cost of the master cylinder.

As illustrated in FIG. 3, a fixing part 21 is formed on the valve body 20 in order to connect the booster and the push rod assembly 30 according to the related art, and the rod body 31 is coupled to the fixing part 21 through a retainer 25. In this case, however, the fixing part 21 included in the valve body 20 unnecessarily occupies a space in the booster. Furthermore, since the retainer 25 is separately added to fix the push rod assembly 30 to the valve body 20, the weight and manufacturing cost of the master cylinder are increased by the addition of the part.

The related art of the present disclosure is disclosed in Korean Patent Application Laid-Open No. 10-2012-0003299 published on Jan. 10, 2012 and entitled "Plunger Master Cylinder for Brake".

SUMMARY

Various embodiments are directed to a master cylinder for a brake, which can reduce the number of parts, thereby reducing the weight and manufacturing cost of a product.

Also, various embodiments are directed to a master cylinder for a brake, which can reduce contact noise and a sense of being stuck, when a vehicle is braked.

Also, various embodiments are directed to a master cylinder for a brake, which is formed of a synthetic resin material to reduce the weight of a product.

In an embodiment, a master cylinder for a brake may include: a cylinder housing; a first piston within the cylinder housing, and movable by an operation force received from a brake pedal; and a second piston within the cylinder housing, and movable in connection with the first piston. The first piston may include: a first piston body partially within the cylinder housing; and a booster connection in the direction opposite to the direction in which the first piston body faces the second piston, integrated with the first piston body, and connected to a booster so as to receive the operation force of the brake pedal.

The first piston body and the booster connection may include a synthetic resin material.

The booster connection may include: a pressing part extending from an end of the cylindrical first piston body, facing the booster, and pressed by a valve body installed within the booster; and a connection piece protruding from the pressing part toward the booster, and connected to the valve body.

The connection piece may be in a ring shape formed along a circumference of the pressing part, and have a diameter larger than the diameter of the first piston body.

The first piston may further include: a first return spring inserted into the first piston body, and configured to return the first piston body to the original state; and a first piston rod coupled to the first piston body, and protruding toward the second piston.

The second piston may include: a second piston body within the cylinder housing, and reciprocated in the cylinder housing; a second return spring within the second piston body, and configured to return the second piston body to an original state; and a second piston rod provided on the second piston body.

The first return spring may have one end supported by the second piston body and the other end supported by the first piston body.

The second return spring may have one end supported by an inner surface of the cylinder housing and the other end supported by one side of the second piston body.

In accordance with the embodiment of the present disclosure, since the first piston body and the booster connection may be integrated with each other, the number of parts may be reduced, and the manufacturing process may be simplified to reduce the weight and manufacturing cost of a product.

Furthermore, as the first piston body and the booster connection are integrated with each other, it is possible to reduce contact noise and a sense of being stuck when the vehicle is braked.

Furthermore, as the first piston body and the booster connection of the first piston are formed of synthetic resin, not steel, it is possible to reduce the weight of the product.

DETAILED DESCRIPTION OF THE ILLUSTRATED EMBODIMENTS

Hereinafter, a master cylinder for a brake will be described below with reference to the accompanying drawings through various exemplary embodiments.

First, embodiments which will be described are embodiments suitable for promoting understandings of the technical features of the master cylinder for a brake in accordance with the present disclosure. However, the present disclosure is not limited to the following embodiments, or the technical features of the present disclosure are not limited by the following embodiments, and various modifications can be applied without departing the scope of the present disclosure.

FIGS. 4 to 8 illustrate a master cylinder 100 for a brake in accordance with an embodiment of the present disclosure.

Figure 4:
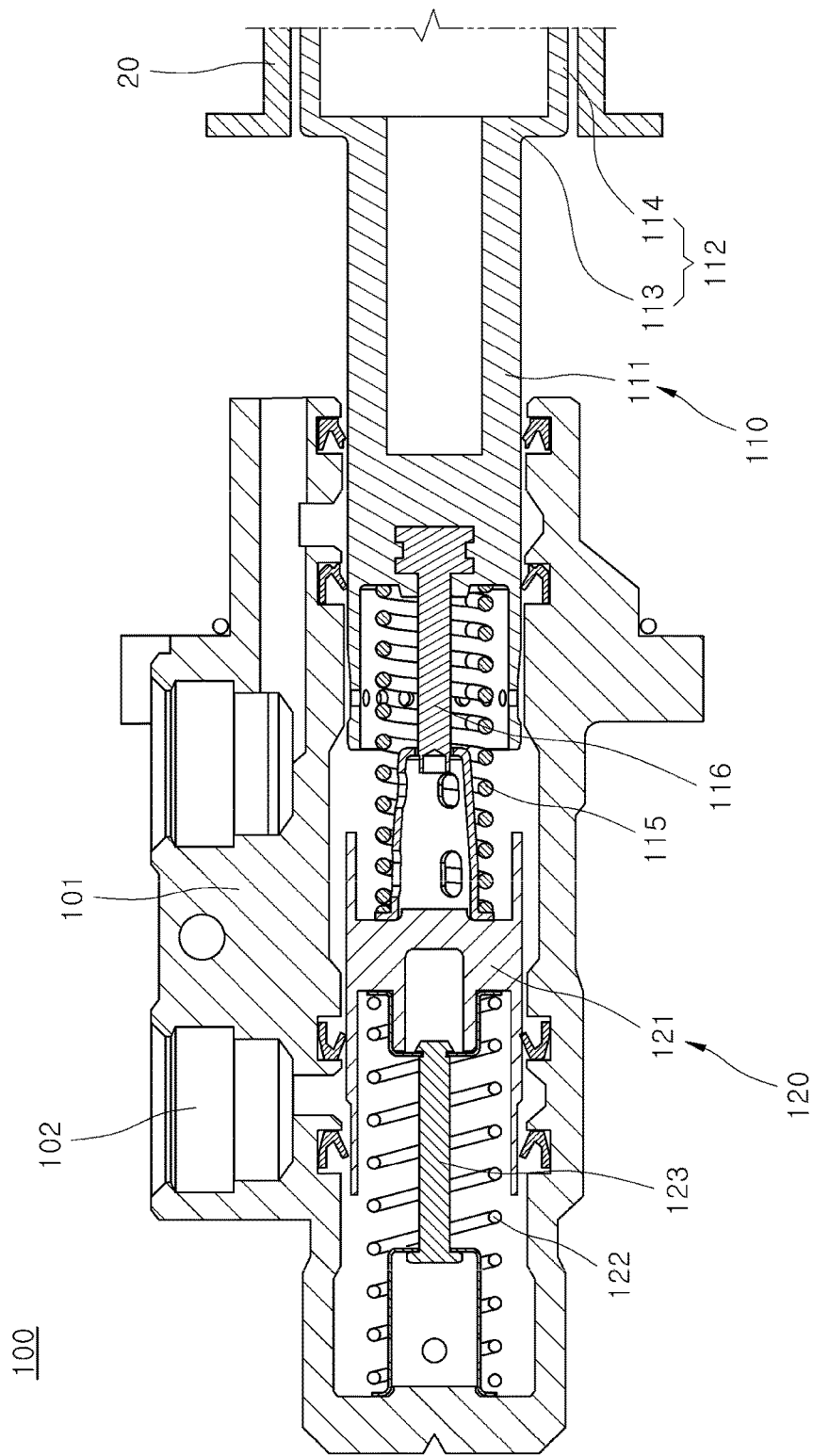
FIG. 4 is a cross-sectional view illustrating a master cylinder for a brake in accordance with an embodiment of the present disclosure.
Figure 5:
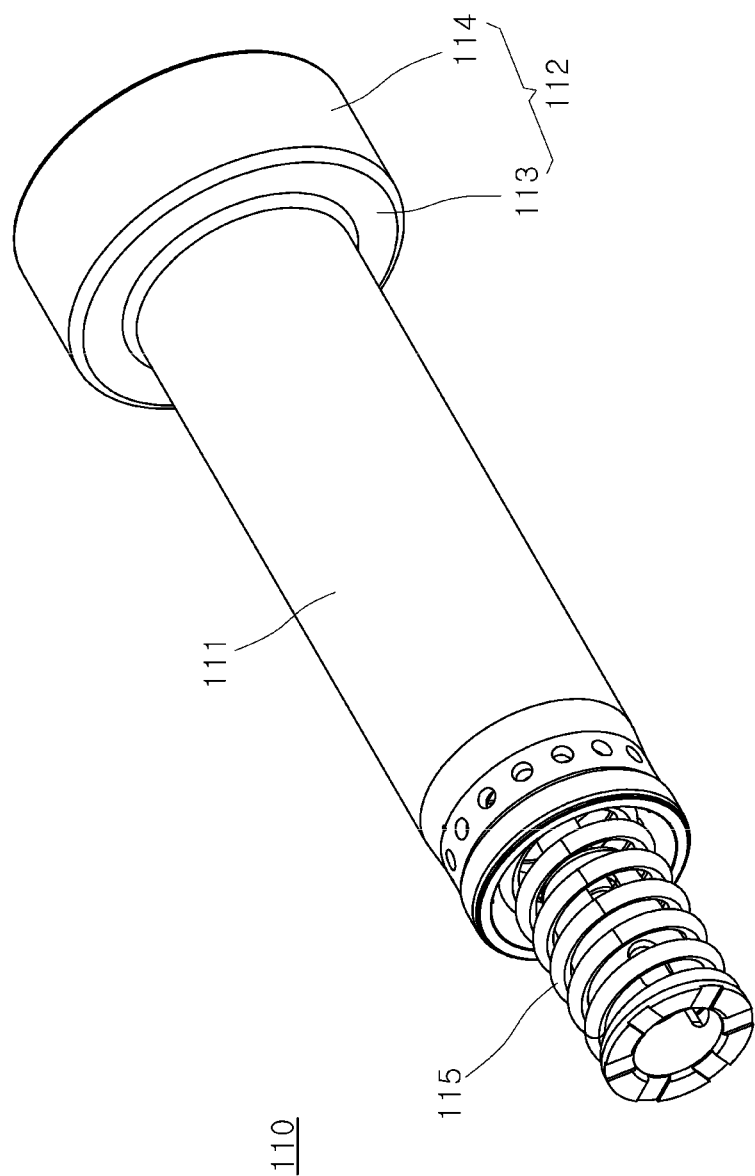
FIG. 5 is a perspective view illustrating a first piston in accordance with the embodiment of the present disclosure.
Figure 6:
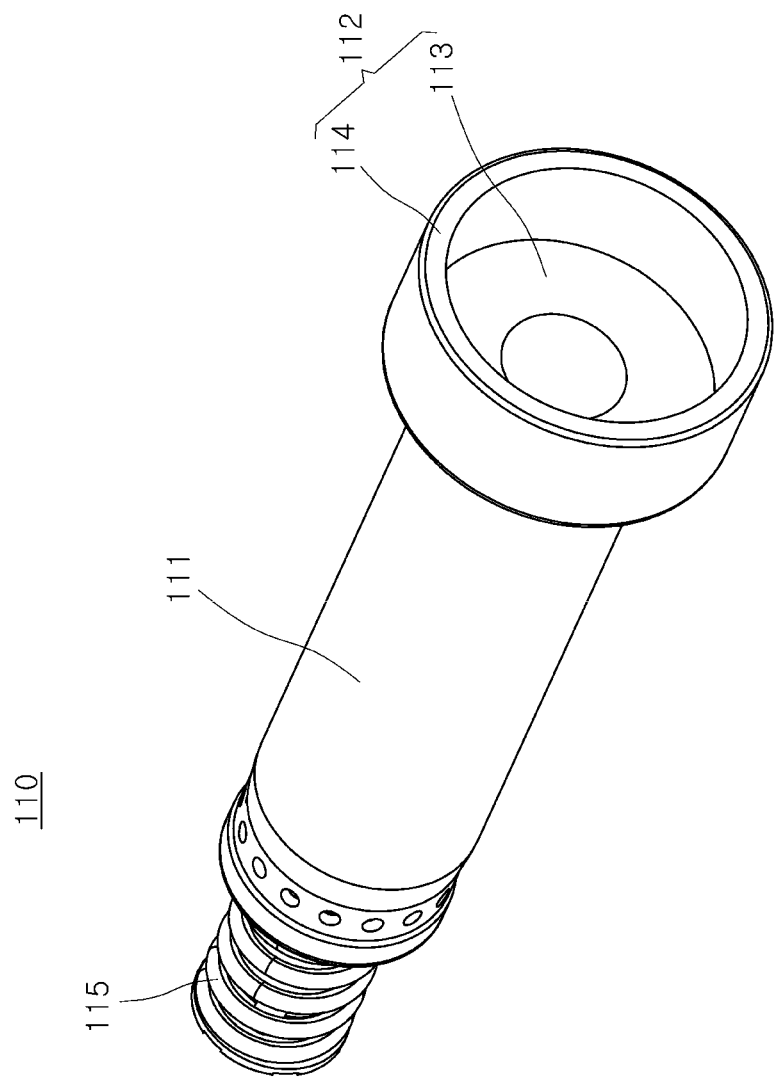
FIG. 6 is a perspective view illustrating the first piston in accordance with the embodiment of the present disclosure.
Figure 7:
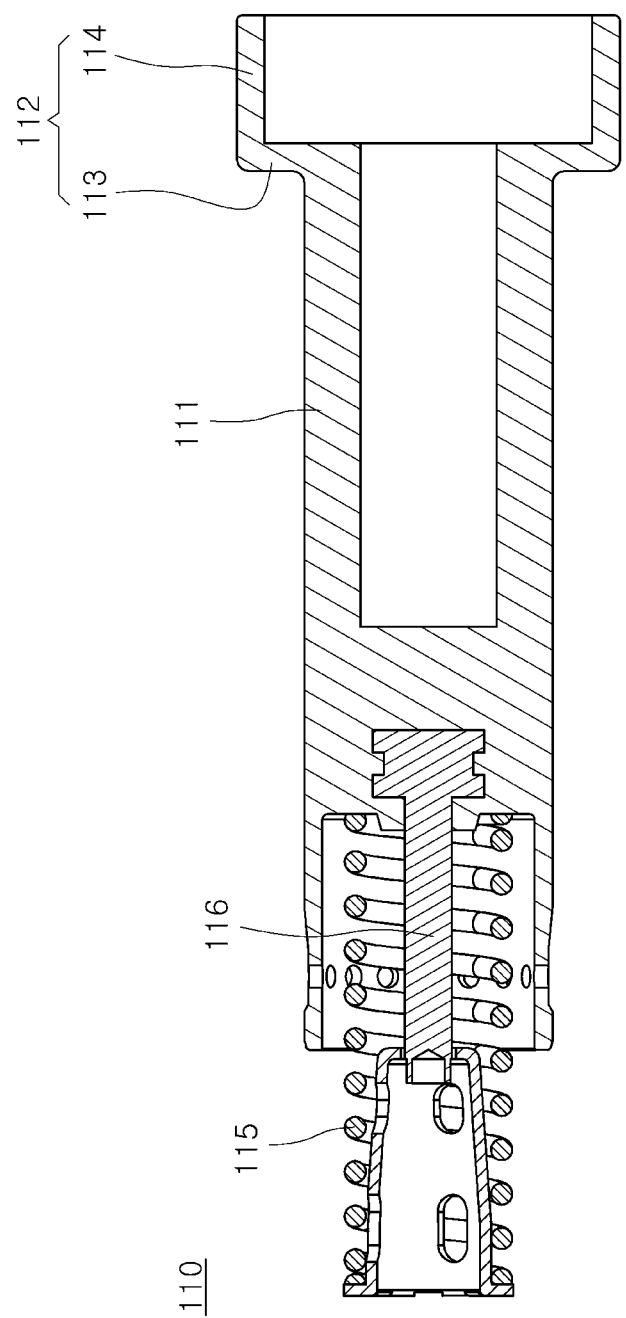
FIG. 7 is a cross-sectional view of FIG. 5.
Figure 8:
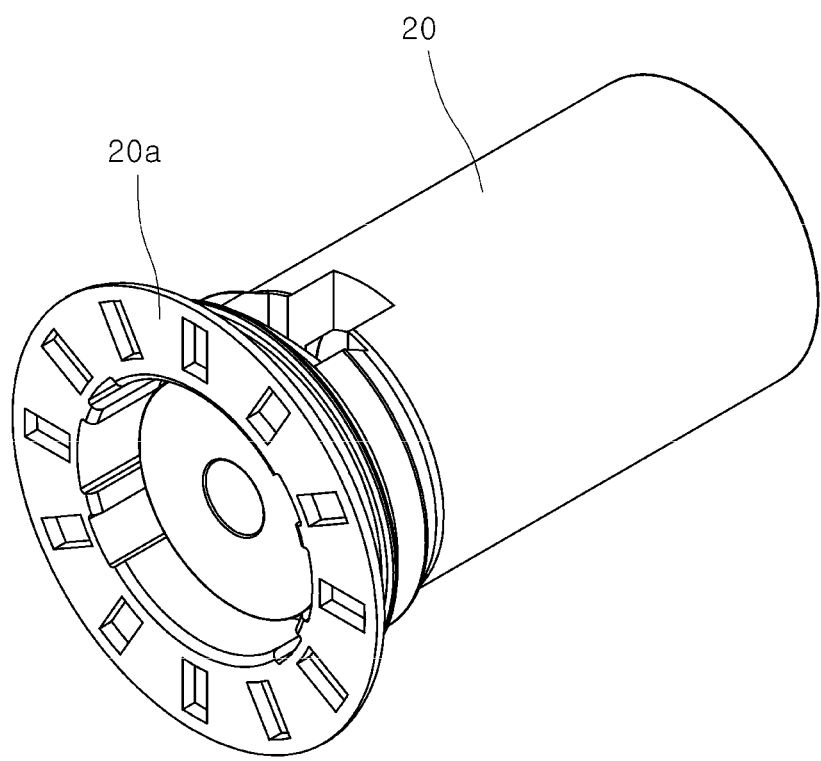
FIG. 8 is a perspective view illustrating a valve body connected to the first piston in accordance with the embodiment of the present disclosure.

FIG. 4 is a cross-sectional view illustrating the master cylinder 100 for a brake in accordance with the embodiment of the present disclosure, and FIGS. 5 and 6 are perspective views illustrating a first piston 110 in accordance with the embodiment of the present disclosure. FIG. 7 is a cross-sectional view of FIG. 5, and FIG. 8 is a perspective view illustrating a valve body 20 connected to the first piston 110 in accordance with the embodiment of the present disclosure.

Referring to FIGS. 4 to 8, the master cylinder 100 for a brake in accordance with the embodiment of the present disclosure includes a cylinder housing 101, the first piston 110 and a second piston 120.

The cylinder housing 101 may have an internal space in which fluid is contained. The internal space of the cylinder housing 101 may be elongated in a side-to-side direction (based on FIG. 4), while being open toward a booster. The cylinder housing 101 may be coupled to an oil tank (not illustrated), and oil of the oil tank may be introduced into the cylinder housing 101 through an oil inlet 102.

The first piston 110 may be installed in the cylinder housing 101, and moved by an operation force received from a brake pedal. The second piston 120 is inserted into the cylinder housing 101, and moved in connection with the first piston 110.

Specifically, the first and second pistons 110 and 120 may be reciprocated in the side-to-side direction along the internal space of the cylinder housing 101. The first piston 110 may be connected to the booster and moved by the operation force received from the brake pedal, and the second piston 120 may be moved inside the cylinder housing 101 by the first piston 110.

While the first and second pistons 110 and 120 are moved, hydraulic pressure may be generated in the master cylinder 100. The hydraulic pressure generated by the master cylinder 100 may be applied to a wheel cylinder or a caliper cylinder, thereby generating a braking force against a wheel.

The first piston 110 includes a first piston body 111 and a booster connection 112.

At least a portion of the first piston body 111 may be inserted into the cylinder housing 101. Specifically, the first piston body 111 may be formed in a cylindrical shape, and partially inserted into the internal space of the cylinder housing 101. Then, when the first piston body 111 is pressed by a boosting force of the booster, the first piston body 111 may be slid along the internal space of the cylinder housing 101.

The booster connection 112 is formed in the opposite direction to the direction in which the first piston body 111 faces the second piston 120. The booster connection 112 is integrated with the first piston body 111, and connected to the booster so as to receive the operation force of the brake pedal.

The booster connection 112 may be directly connected to the valve body 20 installed in the booster, and pressed by the valve body 20 when the boosting force is generated by the booster. Thus, the first piston body 111 integrated with the booster connection 112 may be moved.

Figure 1:
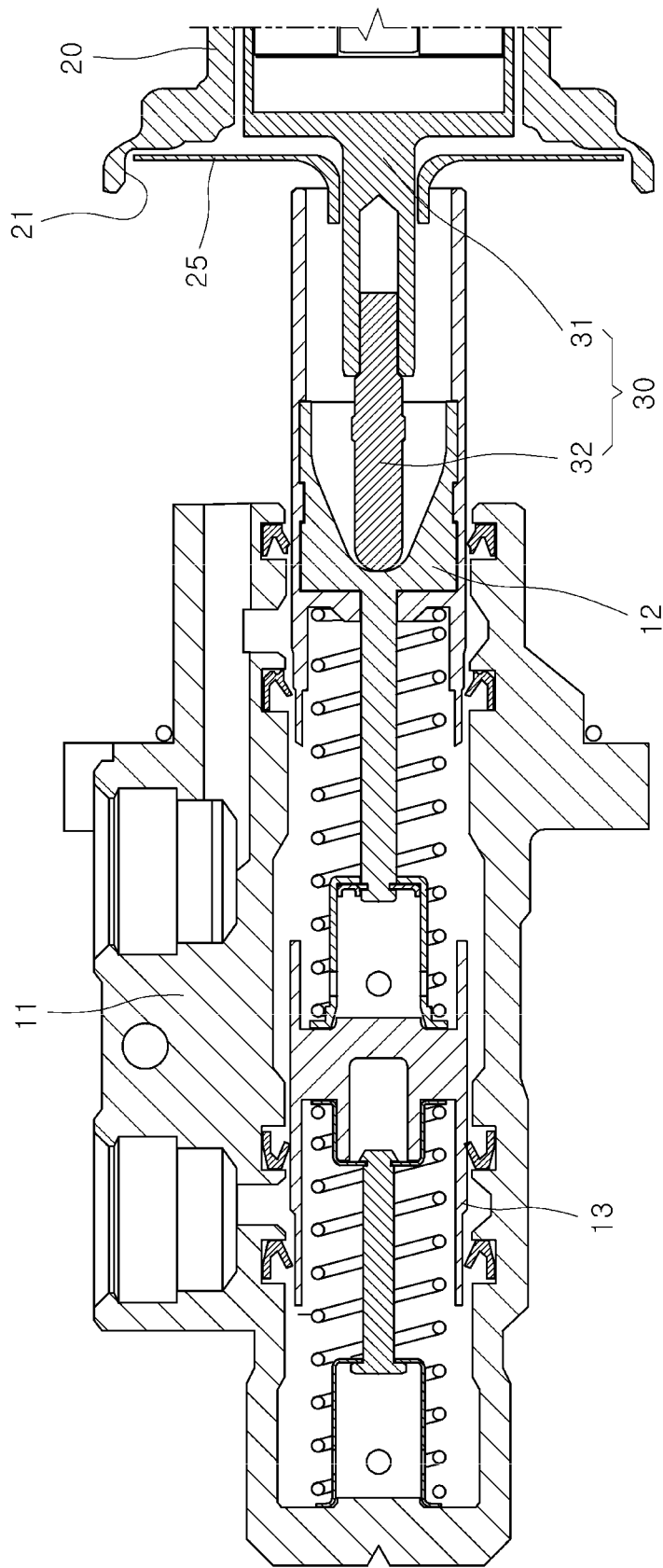
FIG. 1 is a cross-sectional view illustrating a booster and a master cylinder according to the related art.
Figure 2:
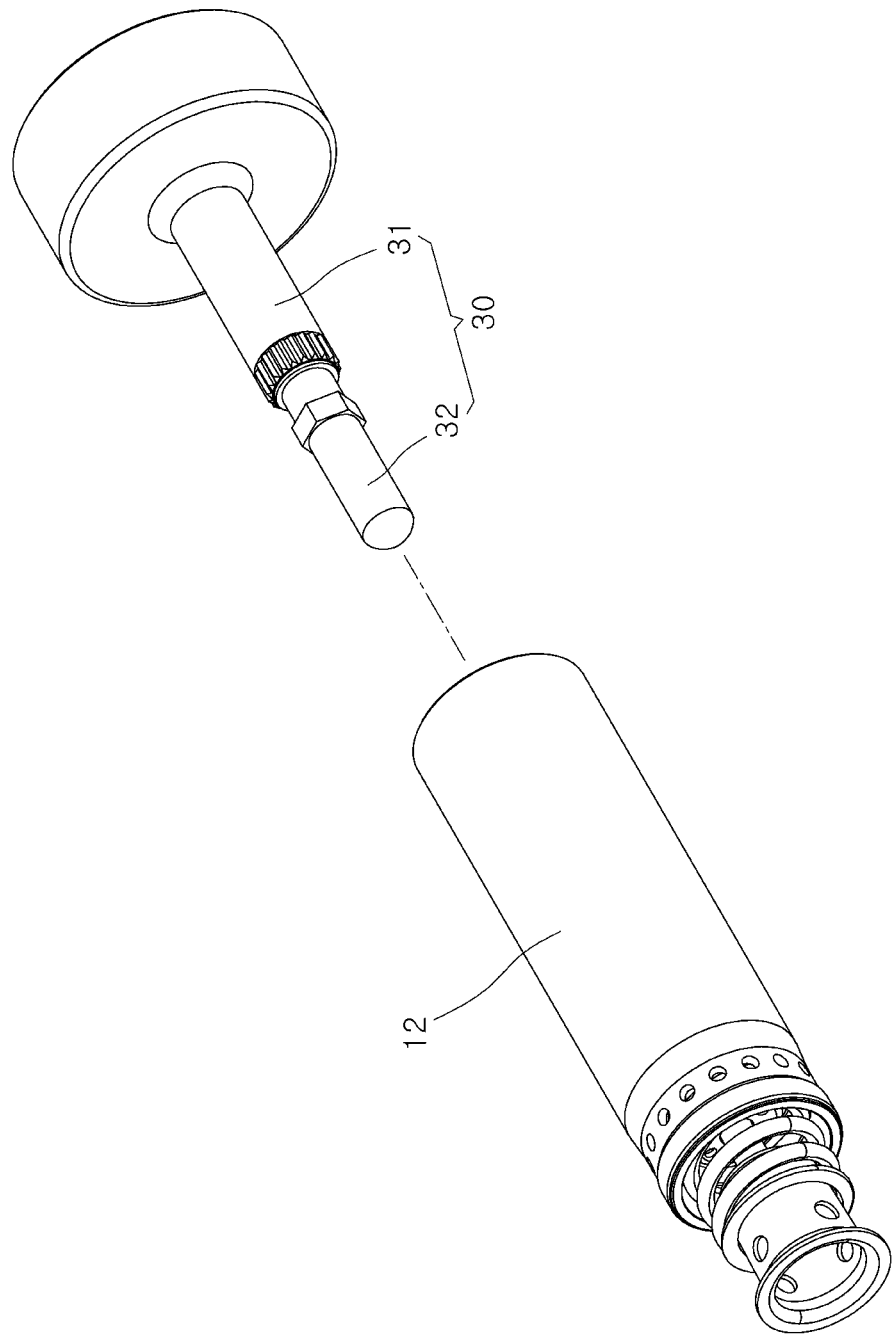
FIG. 2 is a perspective view illustrating a primary piston and a push rod assembly according to the related art.
Figure 3:
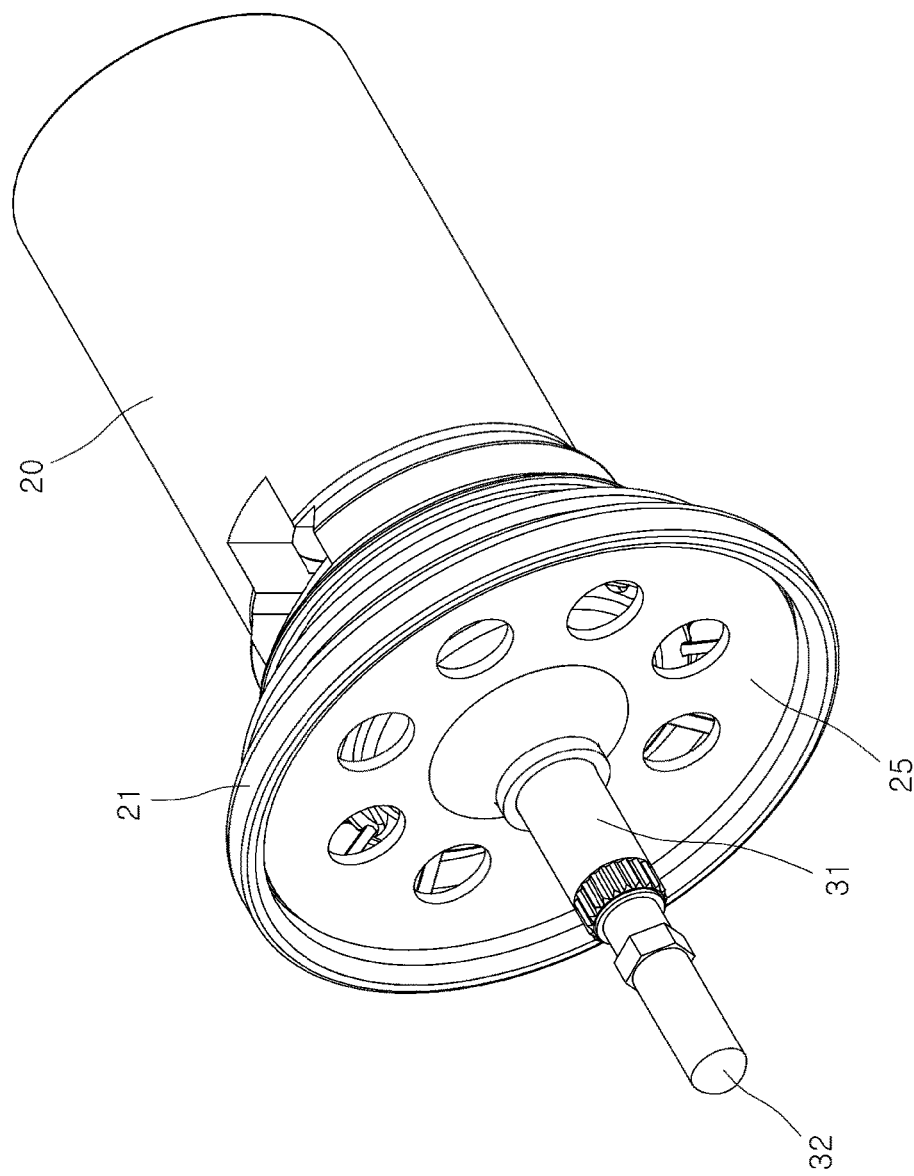
FIG. 3 is a perspective view illustrating a valve body according to the related art.

As the booster connection 112 is connected to the valve body 20 and transfers a pressing force by the booster to the first piston body 111, the booster connection 112 may play the role of the push rod according to the related art. That is, the first piston 110 in accordance with the embodiment of the present disclosure may include the first piston body 111 and the booster connection 112, which are integrated with each other, thereby forming the structure in which the primary piston 12 (see FIG. 1) and the push rod assembly 30 (see FIG. 1) according to the related art are integrated with each other.

In accordance with the embodiment of the present disclosure, the first piston body 111 and the booster connection 112 may be integrated with each other. Thus, since the number of parts is reduced and the manufacturing process is simplified, the weight and manufacturing cost of a product may be reduced.

In accordance with the embodiment of the present disclosure, the first piston body 111 and the booster connection 112 of the first piston 110 may be integrated with each other, which makes it possible to omit the push rod assembly 30 according to the related art, which is separately mounted.

Furthermore, as illustrated in FIG. 8, a process of forming the fixing part 21 for fixing the push rod assembly 30 to an end portion 20a of the valve body 20 may be omitted, and a process of assembling the retainer 25 may be omitted. Therefore, the number of parts and the weight of the product may be reduced, and the manufacturing process may be simplified.

In the master cylinder 100 for a brake in accordance with the embodiment of the present disclosure, the first piston body 111 and the booster connection 112 may be integrated with each other, which makes it possible to reduce contact noise and a sense of being stuck.

In the related art, the push rod assembly 30 and the primary piston 12 are separated from each other at normal times, and contacted with each other when the brake pedal is operated, thereby causing noise and a sense of being stuck. Thus, the sensitivity quality of the brake may be degraded (see FIG. 1). In accordance with the embodiment of the present disclosure, the integrated first piston 110 may be provided to reduce noise and a sense of being stuck, which are caused by collision. Thus, it is possible to improve the sensitivity quality of the brake.

The first piston body 111 and the booster connection 112 may include a synthetic resin material. For example, the first piston body 111 and the booster connection 112 may be formed of phenolic resin. Since phenolic resin has high strength, the boosting force of the booster may be effectively transferred when the brake pedal is operated. The materials of the first piston body 111 and the booster connection 112 are not limited to phenolic resin, but various synthetic resin materials may be applied thereto.

As described above, the first piston body 111 and the booster connection 112 of the first piston 110 in accordance with the embodiment of the present disclosure may be formed of synthetic resin, not steel. Thus, the weight of the product may be reduced.

In accordance with the embodiment of the present disclosure, the manufacturing process may be changed to reduce the manufacturing cost. In the related art, since the primary piston 12 and the push rod assembly 30 are formed of steel or aluminum, processing or forging needs to be applied thereto. However, in accordance with the embodiment of the present disclosure, the integrated first piston 110 may be manufactured through an injection molding method using resin, which makes it possible to reduce the manufacturing cost of the product.

Referring to FIGS. 4 to 7, the booster connection 112 may include a pressing part 113 and a connection piece 114.

The pressing part 113 may be extended from an end of the cylindrical first piston body 111, facing the booster, and pressed by the valve body 20 installed in the booster.

For example, the pressing part 113 may be formed in a disk shape corresponding to a donut shape. The pressing part 113 may be integrated with the end of the first piston body 111, facing the booster. The pressing part 113 may be contacted with the valve body 20. During braking, the pressing part 113 may be pressed in the axial direction of the first piston body 111 by the valve body 20.

The connection piece 114 may be protruded from the pressing part 113 toward the booster, and connected to the valve body 20.

For example, the connection piece 114 may be formed in a ring shape along the circumference of the pressing part 113, and have a larger diameter than the diameter of the first piston body 111. Thus, the first piston body 111 may be stably connected to the valve body 20. Simultaneously, the pressing force may be effectively transferred to the first piston body 111 through the pressing part 113.

The shapes of the pressing part 113 and the connection piece 114 of the booster connection 112 are not limited to the above-described shapes, but may be modified in various manners, as long as the pressing force of the valve body 20 can be stably transferred to the first piston body 111.

The first piston 110 may further include a first return spring 115 and a first piston rod 116.

The first return spring 115 may be inserted into one side of the first piston body 111, and provided to return the first piston body 111 to the original state. The first piston rod 116 may be coupled to the one side of the first piston body 111, and connected to protrude toward the second piston body 121.

The first piston rod 116 may be integrated with the first piston body 111. However, the present disclosure is not limited thereto, but the first piston rod 116 may be coupled to the first piston body 111.

The first return spring 115 may be fitted to the first piston rod 116 and inserted into the first piston body 111. The first return spring 115 may be installed between the first piston body 111 and a second piston body 121, such that the other end thereof is supported by the first piston body 111 and one end thereof is supported by the second piston body 121. The first return spring 115 may be contracted when the vehicle is braked. When the braking is released, the first return spring 115 may provide an elastic return force to move the first piston body 111 to the original position.

The second piston 120 may include the second piston body 121, a second return spring 122 and a second piston rod 123.

The second piston body 121 may be inserted into the cylinder housing 101, and reciprocated by the first piston 110. The second piston body 121 may have the other side connected to the first piston rod 116, and support the one end of the first return spring 115. Thus, the second piston body 121 may be elastically pressed and moved when the second piston body 121 is moved.

The second return spring 122 may be inserted into one side of the second piston body 121, and provided to return the second piston body 121 to the original state thereof. The second piston rod 123 may be provided on one side of the second piston body 121.

Specifically, both ends of the second return spring 122 may be supported by the inner surface of the cylinder housing 101 and the second piston body 121. The second return spring 122 may be contracted when the vehicle is braked. When the braking is released, the second return spring 122 may provide an elastic return force to move the second piston body 121 to the original position thereof.

When the master cylinder for a brake in accordance with the embodiment of the present disclosure is used, the first piston body and the booster connection may be integrated with each other. Thus, the number of parts may be reduced, and the manufacturing process may be simplified to reduce the weight and manufacturing cost of a product.

Furthermore, as the first piston body and the booster connection are integrated with each other, it is possible to reduce contact noise and a sense of being stuck when the vehicle is braked.

Furthermore, as the first piston body and the booster connection of the first piston are formed of synthetic resin, not steel, it is possible to reduce the weight of the product.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A master cylinder for a brake, comprising:
a cylinder housing having an inner space and an opening exposing the inner space;
a first piston coupled between the cylinder housing and a booster and configured to move toward the inner space of the cylinder housing when applied with an operation force from the booster; and
a second piston positioned at the inner space of the cylinder housing and configured to move when the first piston moves,
wherein the first piston comprises:
a first piston body having (1) a first end portion extending into the inner space of the cylinder housing via the opening of the cylinder housing and facing the second piston, and (2) a second end portion positioned outside the cylinder housing; and
a booster connection integral with the first piston body, connected to a second end of the first piston body and coupled to the booster,
wherein the first piston body and the booster connection comprise a synthetic resin material.

2. The master cylinder of claim 1, wherein the booster connection comprises:
a pressing part extending from the second end of the first piston body and facing the booster and configured to be pressed by the booster; and
a connection piece protruding from the pressing part toward the booster and connected to the booster.

3. A master cylinder, comprising:
a cylinder housing;
a first piston in the cylinder housing and movable by an operation force received from a brake pedal; and
a second piston in the cylinder housing and movable with the first piston,
wherein the first piston comprises:
a first piston body partially within the cylinder housing; and
a booster connection oriented in a direction opposite to that in which the first piston body faces the second piston, integrated with the first piston body, and connected to a booster so as to receive the operation force of the brake pedal,
wherein the booster connection comprises:
a pressing part extending from an end of the first piston body, facing the booster, and configured to be pressed by the booster; and
a connection piece protruding from the pressing part toward the booster and connected to the booster, and
wherein the connection piece has a ring shape extending along a circumference of the pressing part and having a diameter larger than that of the first piston body.

4. The master cylinder of claim 3, wherein the first piston further comprises:
a first return spring connected to the first piston body and configured to return the first piston body to an original state; and
a first piston rod coupled to the first piston body and protruding toward the second piston.

5. The master cylinder of claim 4, wherein the second piston comprises:
a second piston body positioned at the inner space of the cylinder housing and configured to reciprocate in the cylinder housing;
a second return spring connected to the second piston body and configured to return the second piston body to an original state; and
a second piston rod connected to the second piston body.

6. The master cylinder of claim 5, wherein the first return spring has a first end in contact with the second piston body and a second end in contact with the first piston body.

7. The master cylinder of claim 5, wherein the second return spring has a first end in contact with an inner surface of the cylinder housing and a second end in contact with the second piston body.

* * * * *